(12) United States Patent
Kuroda

(10) Patent No.: US 7,431,990 B2
(45) Date of Patent: Oct. 7, 2008

(54) RESIN COMPOSITION FOR ENCAPSULATING SEMICONDUCTOR CHIP AND SEMICONDUCTOR DEVICE THEREWITH

(75) Inventor: Hirofumi Kuroda, Tochigi (JP)

(73) Assignee: Sumitomo Bakelite Co, Tokyo (JP)

( * ) Notice: Subject to any disclaimer, the term of this patent is extended or adjusted under 35 U.S.C. 154(b) by 471 days.

(21) Appl. No.: 11/137,820

(22) Filed: May 25, 2005

(65) Prior Publication Data

US 2005/0267237 A1 Dec. 1, 2005

(30) Foreign Application Priority Data

May 27, 2004 (JP) .............................. 2004-158372

(51) Int. Cl.
| | | |
|---|---|---|
| B32B 27/38 | (2006.01) | |
| B32B 27/18 | (2006.01) | |
| B32B 27/04 | (2006.01) | |
| C08L 63/00 | (2006.01) | |
| H01L 23/29 | (2006.01) | |
| H01L 21/56 | (2006.01) | |

(52) U.S. Cl. ....................... 428/413; 257/793; 438/127; 523/400; 525/523

(58) Field of Classification Search ................. 428/413, 428/127; 523/400; 525/523
See application file for complete search history.

(56) References Cited

U.S. PATENT DOCUMENTS

| | | | | |
|---|---|---|---|---|
| 6,242,110 | B1 * | 6/2001 | Iwasaki et al. | 428/620 |
| 7,023,098 | B2 * | 4/2006 | Umeno et al. | 257/787 |
| 7,291,684 | B2 * | 11/2007 | Umeno et al. | 525/481 |
| 2004/0214003 | A1 * | 10/2004 | Umeno et al. | 428/413 |
| 2004/0217489 | A1 * | 11/2004 | Umeno et al. | 257/787 |

FOREIGN PATENT DOCUMENTS

| | | | |
|---|---|---|---|
| JP | 3-29352 | A | 2/1991 |
| JP | 07-130919 | | 5/1995 |
| JP | 07-1732255 | * | 7/1995 |
| JP | 08-020673 | | 1/1996 |
| JP | 63-225616 | A | 9/1998 |
| JP | 11-140277 | | 5/1999 |
| JP | 2002-322347 | A | 11/2002 |
| JP | 2003-105056 | A | 4/2003 |
| JP | 2003-128759 | | 5/2003 |
| JP | 2003-165896 | A | 6/2003 |
| JP | 2004-115742 | | 4/2004 |
| JP | 2004-124023 | A | 4/2004 |
| JP | 2005-89486 | | 4/2005 |
| JP | 2005-206725 | A | 8/2005 |

OTHER PUBLICATIONS

Machine translation of JP 07-173255, provided by the JPO website (1995).*
Machine translation of JP 2003-165896, provided by the JPO website (2003).*
Machine translation of JP 2003-128759, provided by the JPO website.*
International Search Report dated: Aug. 30, 2005.

* cited by examiner

*Primary Examiner*—Michael J Feely
(74) *Attorney, Agent, or Firm*—Smith, Gambrell & Russell

(57) ABSTRACT

An objective of this invention is to provide an epoxy resin composition for encapsulating a semiconductor chip, which is excellent in flowability and moldability without deterioration in crack resistance during soldering and flame retardance. Specifically, this invention provides a resin composition for encapsulating a semiconductor chip comprises an epoxy resin (A) containing the specific structure; a phenolic resin (B) containing the specific structure; an inorganic filler (C); a curing accelerator (D); a silane coupling agent (E); and Compound (F) containing an aromatic ring in which at least two adjacent carbon atoms of the ring member carbon atoms are coupled to a hydroxyl group, respectively.

5 Claims, No Drawings

RESIN COMPOSITION FOR ENCAPSULATING SEMICONDUCTOR CHIP AND SEMICONDUCTOR DEVICE THEREWITH

This application is based on Japanese patent application NO. 2004-158372, the content of which incorporated hereinto by reference.

BACKGROUND OF THE INVENTION

1. Field of the Invention

This invention relates to a resin composition for encapsulating a semiconductor chip and a semiconductor device therewith.

2. Description of the Related Art

Recently, epoxy resin compositions have been predominantly used for encapsulating a semiconductor chip because of their good balance among productivity, a cost and reliability. Along with reduction in a size and a thickness in a semiconductor device, an epoxy resin composition for encapsulating with a lower viscosity and higher strength has been needed. Furthermore, in terms of environmental concerns, it has been increasingly needed to make a device having flame retardance without a flame retardant such as Br compounds and antimony oxide. From such a situation, there has been recently a distinctive tendency to employing a less viscous resin and adding more inorganic fillers to an epoxy resin composition. As a new trend, a semiconductor device has been more frequently mounted using an unleaded solder with a higher melting point than a conventional solder. For applying such a solder, a mounting temperature must be higher by about 20° C. than a conventional temperature, and thus a mounted semiconductor device becomes considerably less reliable than a device of the related art. Therefore, the need for improving reliability in a semiconductor device by providing a higher-level epoxy resin composition has increasingly become stronger, which further accelerates reducing a resin viscosity and increasing the amounts of inorganic fillers.

As well-known technique, a low viscosity and a high flowability during molding can be maintained by using a resin with a lower melt viscosity (see, Japanese Laid-open Patent Publication NO. 1995-130919) or by surface-processing inorganic fillers with a silane coupling agent for increasing the amounts of the inorganic fillers (see, Japanese Laid-open Patent Publication NO. 1996-20673). However, any of these methods cannot simultaneously meet all requirements of crack resistance during soldering, higher flowability and flame retardance.

Therefore, an epoxy resin composition comprising phenol aralkyl epoxy resin containing biphenylene structure and phenol aralkyl hardener containing biphenylene structure, which are excellent in crack resistance during soldering and flame retardance, is proposed in the name of Sumitomo Bakelite Co. Ltd., who is the present assignee (see, Japanese Laid-open Patent Publication No. 1999-140277). Since such an epoxy resin composition contains many aromatic rings in a molecular structure, the epoxy resin composition is burnt to form a carbonized layer at the surface of moldings therewith, so that further burnings may be restrained and that the epoxy resin composition may show the excellent flame retardance. Further, the improvement of the crack resistance during soldering is contributed by the improvement of hydrophobicity by containing an aromatic ring structure, and the lowering elastic modulus at high-temperature by growing in the distance between cross-linking points.

SUMMARY OF THE INVENTION

However, there is the high demand for the flame retardant-free products and improvement of the reliability of a semiconductor device, and the further improvement of the crack resistance during soldering and flame retardance is desired. For that purpose, it is considered that such a demand may be met by employing the large amount of an inorganic filler. However, the melt viscosity of the epoxy resin containing biphenylene structure and the hardener is not low, so that the flowability and curability are deteriorated by blending the large amount of the inorganic filler. Therefore, there is a demand for a technique that meets both of the flowability and curability, too.

From one aspect of the invention, an object is to provide a resin composition for encapsulating a semiconductor chip, which is excellent in the crack resistance during soldering, flame retardance, flowability and curability, and a semiconductor device therewith.

The present invention thus provides:

(1) A resin composition for encapsulating a semiconductor chip comprising:

an epoxy resin (A) represented by general formula (1):

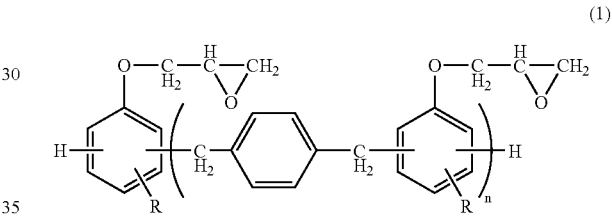

wherein each R may be the same or different from each other, and represents hydrogen or hydrocarbon group having 4 or less of carbon atoms; and n is an average, and represents a positive number from 1 to 5;

a phenolic resin (B) represented by general formula (2)

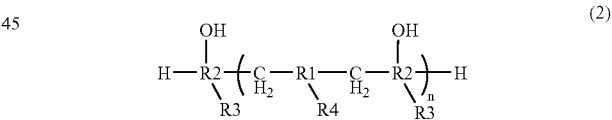

wherein R1 represents phenylene, biphenylene or naphthylene; R2 forms together with OH group phenol, alpha-naphthol or beta-naphthol structure; R3 and R4 are groups introduced into R2 and R1, respectively, and each represents hydrogen or a hydrocarbon group having 10 or less of carbon atoms, and may be the same or different from each other; and n is an average, and represents a positive number from 1 to 10;

an inorganic filler (C);

a curing accelerator (D);

a silane coupling agent (E); and

Compound (F) containing an aromatic ring in which at least two adjacent carbon atoms of the ring member carbon atoms are coupled to a hydroxyl group, respectively:

(2) The resin composition for encapsulating a semiconductor chip according to (1), wherein the amount of said Compound (F) is not less than 0.01% by weight:

(3) The resin composition for encapsulating a semiconductor chip according to (1), wherein the amount of said silane coupling agent (E) is not less than 0.01% by weight and not more than 1% by weight:

(4) The resin composition for encapsulating a semiconductor chip according to (1), wherein said Compound (F) contains an aromatic ring in which two adjacent carbon atoms of the ring member carbon atoms are coupled to a hydroxyl group, respectively:

(5) The resin composition for encapsulating a semiconductor chip according to (1), wherein the aromatic ring of said Compound (F) is a naphthalene ring:

(6) The resin composition for encapsulating a semiconductor chip according to (5), wherein said Compound (F) contains a naphthalene ring in which two adjacent carbon atoms of the naphthalene ring member carbon atoms are coupled to a hydroxyl group, respectively:

(7) The resin composition for encapsulating a semiconductor chip according to (1), wherein the amount of said inorganic filler (C) is not less than 80% by weight and not more than 92% by weight: and (8) A semiconductor device wherein a semiconductor chip is encapsulated by the use of a resin composition for encapsulating a semiconductor chip according to (1).

Further, the compound represented by general formula (2) includes the following compound represented by general formula (2'):

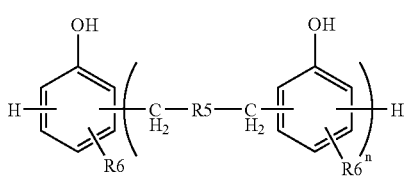

wherein R5 represents phenylene or biphenylene; each R6 may be the same or different from each other, and represents hydrogen or hydrocarbon group having 4 or less of carbon atoms; and n is an average, and represents a positive number from 1 to 5.

As described above, the invention can provide a resin composition for encapsulating a semiconductor chip, which is excellent in flowability at molding and moldability without deterioration in crack resistance during soldering and flame retardance, and which had been hard to obtain by the conventional technique, so that there is provided an epoxy resin composition suitable for packaging a surface-mounted semiconductor chip.

DETAILED DESCRIPTION OF THE INVENTION

A resin composition for encapsulating a semiconductor chip according to the invention will be illustrated by the following embodiment. Those skilled in the art will recognize that many alternative embodiments can be accomplished using the teachings of the present invention and that the invention is not limited to the embodiment illustrated for explanatory purposed.

An epoxy resin composition of the embodiment of the resin composition for encapsulating a semiconductor chip comprises an epoxy resin (A) represented by the following general formula (1), a phenolic resin (B) represented by the following general formula (2), an inorganic filler (C), a curing accelerator (D), a silane coupling agent (E) and Compound (F) containing an aromatic ring in which at least two adjacent carbon atoms of the ring member carbon atoms are coupled to a hydroxyl group, respectively. There is thus provided a resin composition for encapsulating a semiconductor chip, which is excellent in the crack resistance during soldering, flame retardance, flowability and curability.

Now, each of the components above will be described.

The epoxy resin (A) employable for the present embodiment contains the following structure of the general formula (1).

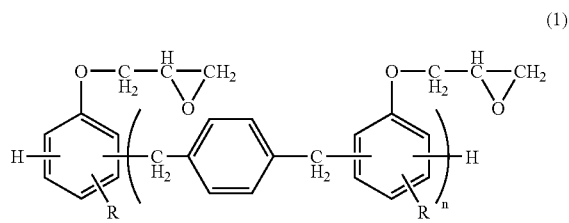

In the general formula (1), each R may be the same or different from each other, and represents hydrogen or hydrocarbon group having 4 or less of carbon atoms, for example methyl, ethyl and t-butyl. n is an average of the number of units containing phenylene and oxyphenylene structures of a molecular chain. n represents a positive number from 1 to 5, preferably from 1 to 3.

The resin composition for encapsulating a semiconductor chip employing the epoxy resin (A) contains a smaller amount of aromatic rings compared with the conventionally employed composition containing the biphenylene structure. Although the resin composition of the embodiment shows that the flame retardance is slightly lowered, it exhibits the excellent performance in low viscosity, high curability, high glass transition point Tg, bending strength at heating due to the smaller molecular structure thereof. Further, the composition shows the low viscosity, so that it may contain the larger amount of the inorganic filler, then making up the slight deterioration of the flame retardance of the resin itself, it realizes the excellent crack resistance during soldering due to low water absorption thereof. Moreover, the composition shows high glass transition point Tg, so that the properties for maintenance at high temperature, which is one of the reliabilities of the semiconductor device, thereof become better.

Specific example for the epoxy resin (A) represented by the general formula (1) is shown as the following formula (3), the epoxy resin (A) is not limited to the example:

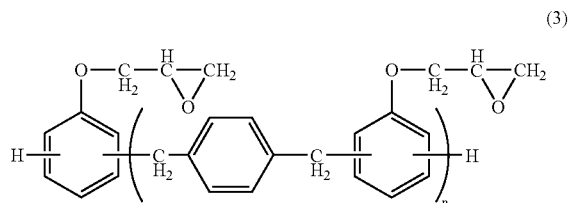

wherein n is the average, and represents a positive number from 1 to 5.

Other epoxy resin may be employed together with the epoxy resin represented by the general formula (1), as far as the effect obtainable by use of the epoxy resin represented by the general formula (1) is not deteriorated. Such an employable epoxy resin includes epoxy group containing monomer, oligomer and polymer, for example, phenol biphenyl aralkyl epoxy resin; crystalline epoxy resins, such as biphenyl epoxy resin, stilbene epoxy resin, hydroquinone epoxy resin, bisphenol F epoxy resin, bisphenol A epoxy resin; ortho-cresol novolak epoxy resin, dicyclopentadiene-modified phenolic epoxy resin, and naphthol epoxy resin. These epoxy resins may be employed singly or in combination of two or more.

Considering reliability on resistance to humidity of an epoxy resin composition for encapsulating a semiconductor chip, it is preferred that ionic impurities such as Na ion and Cl ion are as few as possible in the epoxy resin (A). From the aspect of curability the epoxy equivalent of the epoxy resin (A) is preferably not less than 100 g/eq and not more than 500 g/eq.

The phenolic resin (B) employable for the present embodiment contains the following structure of the general formula (2).

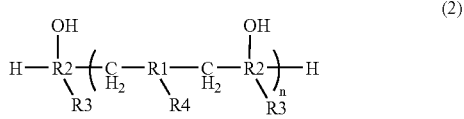

In the formula (2), R1 represents phenylene, biphenylene or naphthylene. Each R2 forms together with OH group phenol, alpha-naphthol or beta-naphthol structure. Each R2 may be the same or different from each other. R3 and R4 are groups introduced into R2 and R1, respectively, and may be the same or different from each other. R3 and R4 each represents hydrogen or a hydrocarbon group having 10 or less of carbon atoms, such as methyl, ethyl and t-butyl. n is an average of the number of units containing phenylene or naphthylene structure portion and oxyphenylene or oxynaphthylene structure portion of a molecular chain. n represents positive number from 1 to 10, preferably 1 to 5.

The phenolic resin (B) as mentioned above contains a hydrophobic phenylene structure, or a hydrophobic and rigid biphenylene structure or naphthylene structure between oxyphenylene structure(s) and/or oxynaphthylene structure(s). Therefore, a cured product of the epoxy resin composition employing the phenolic resin (B) shows the longer distance between the crosslinking points compared with one employing the novolak phenolic resin, so that it exhibits the low elastic modulus at high-temperature, then it is excellent in the adhesion properties with a semiconductor chip, an organic substrate and a metal substrate. The aromatic structure is hydrophobic and contains a small amount of phenolic hydroxyl group, so that it can realize the low water absorption of the epoxy resin composition. Developing such properties makes it possible that the solder resistance of the epoxy resin composition is improved. Further, in a compound containing the naphthylene structure, increase of the glass transition point Tg affected by the rigidity due to the naphthalene rings and lowering coefficient of linear expansion affected by interaction between molecules due to the planer structure thereof make it possible that the low warpage properties are improved in a area-surface-mount type semiconductor package. The aromatic group containing phenolic hydroxyl group (—R2 (OH)—) may be either of phenol, alpha-naphthol or beta-naphthol. Especially in the case that naphthol is employed, in addition to an effect of improving the low warpage properties by the increase of the glass transition point Tg and lowering coefficient of linear expansion in a similar manner to the compound containing the naphthylene structure, since the large amount of aromatic carbons may exist in a molecular, the improvement of the flame retardance can be realized.

The phenolic resin (B) represented by the general formula (2) includes a phenol aralkyl resin containing phenylene structure, a phenol aralkyl resin containing biphenylene structure, and a naphthol aralkyl structure resin containing phenylene structure. However, as far as containing the structure represented by the formula (2), there is no limitation to those resins.

Other phenolic resin may be employed together with the phenolic resin (B) represented by the general formula (2), as far as the effect obtainable by use of the phenolic resin (B) represented by the general formula (2) is not deteriorated. Such an employable phenolic resin includes phenolic novolak resin, cresol novolak resin, triphenol methane type phenolic resin, terpene-modified phenolic resin, dicyclopentadiene-modified phenolic resin. These phenolic resins employed in combination preferably have the hydroxyl equivalent of 90 to 250 g/eq from the aspect of curability.

An inorganic filler (C) employable for the present embodiment includes fused silica, spherical silica, crystal silica, alumina, silicon nitride and aluminum nitride, which are commonly used for an encapsulating material. A particle size of the inorganic filler may be not less than 0.01 μm and not more than 150 μm from the aspect of filling properties into a mold. A filling amount of the inorganic filler (C) may be, for example, not less than 80 wt % and not more than 92 wt % of the total amount of an epoxy resin composition. When a filling amount is too low, there is a tendency that the warpage properties and water absorption of a cured product of the epoxy resin composition may be increased to lead to deterioration in strength and thus insufficient solder resistance. While when it is too high, there is a tendency that flowability of the epoxy resin composition may be deteriorated to lead to deterioration in moldability. Then, the amount of the inorganic filler (C) is set to the above range, so that the epoxy resin composition becomes excellent in the balance.

The curing accelerator (D) employable for the present embodiment may be any compound which can accelerate a reaction between an epoxy group of an epoxy resin and a hydroxyl group of a phenolic resin, and may be selected from those commonly used in an epoxy resin composition as an encapsulating material for a semiconductor chip. Specific examples include phosphorus-containing compounds such as organophosphines, tetra-substituted phosphonium compounds and phosphobetaine compounds; and nitrogen-containing compounds such as 1,8-diazabicyclo(5,4,0)undecene-7, benzyldimethylamine and 2-methylimidazole.

Examples of an organophosphine include primary phosphines such as ethylphosphine and phenylphosphine; secondary phosphines such as dimethylphosphine and diphenylphosphine; tertiary phosphines such as trimethylphosphine, triethylphosphine, tributylphosphine, and triphenylphosphine.

A tetra-substituted phosphonium compound may be a compound represented by general formula (4):

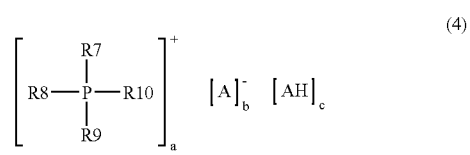

In the general formula (4), P is phosphorus; R7, R8, R9 and R10 are substituted or unsubstituted aromatic group, such as monomethyl-substituted phenyl, monoethyl-substituted phenyl, or alkyl group, such as ethyl, butyl, hexyl. A is an anion of an aromatic organic acid having in the aromatic ring at least one functional group selected from hydroxyl, carboxyl and thiol. AH is an aromatic organic acid having in the aromatic ring at least one functional group selected from hydroxyl, carboxyl and thiol. a and b are an integer of not less than 1 and not more than 3. c is an integer of not less than 0 and not more than 3, provided that a=b.

The compound represented by general formula (4) may be prepared as follows. First, a tetra-substituted phosphonium bromide, an aromatic organic acid and a base are combined in an organic solvent and homogeneously mixed to generate aromatic organic acid anions in the solution system. Then, water is added, so that the compound represented by general formula (4) may be precipitated. A preferable compound represented by general formula (4) is a compound wherein R7, R8, R9 and R10 bound to phosphorus are phenyl; AH is a compound having a hydroxyl group in an aromatic ring, that is, phenols; and A is preferably an anion of the phenols.

A phosphobetaine compound includes a compound represented by general formula (5):

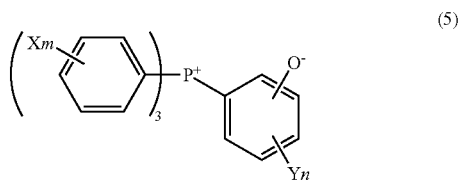

(5)

In the general formula (5), X is hydrogen or alkyl having 1 to 3 carbon atoms. Y is hydrogen or hydroxyl. m and n are an integer of 1 to 3.

The compound represented by general formula (5) may be prepared as follows. First, triaromatic-substituted phosphine for tertiary phosphines and diazonium salt are brought into contact with each other. Then, diazo reaction is carried out between triaromatic-substituted phosphine and diazonium group of diazonium salt to obtain the objective compound. However, there is no limitation to the above mentioned process.

An amount of the curing accelerator (D) employable for the present embodiment may be not less than 0.1% by weight and not more than 1% by weight of the total amount of an epoxy resin composition. When an amount of the curing accelerator (D) is too low, there is a tendency that desired level of curability may not be obtained to the epoxy resin composition. While when it is too high, there is a tendency that flowability of the epoxy resin composition may be deteriorated. Then, the amount of the curing accelerator (D) is set to the above range, so that the epoxy resin composition becomes excellent in the balance.

The silane coupling agent (E) employable for the present embodiment may be selected from epoxysilanes, aminosilanes, ureidosilanes and mercaptosilanes. However, it may be, without limitations, any one which can be reacted between an epoxy resin composition and an inorganic filler to improve interface strength between the epoxy resin composition and the inorganic filler. Later mentioned Compound (F) significantly improves viscosity and flow properties by synergistic effect with a silane coupling agent (E). In order to obtain the sufficient effect by use of the Compound (F), the silane coupling agent (E) is essential. These silane coupling agents (E) may be used singly or in combination of two or more. An amount of the silane coupling agent (E) for the present embodiment may be not less than 0.01% by weight and not more than 1% by weight, preferably not less than 0.05% by weight and not more than 0.8% by weight, more preferably not less than 0.1% by weight and not more than 0.6% by weight of the total amount of an epoxy resin composition. When an amount of the silane coupling agent (E) is too low, there is a tendency that the synergistic effect with the Compound (F) may not be sufficiently obtained. While when it is too high, there is a tendency that an epoxy resin composition becomes more water-absorptive. In any cases, the solder resistance in packaging a semiconductor chip with the epoxy resin composition may be deteriorated. Then, the amount of the silane coupling agent (E) is set to the above range, so that the epoxy resin composition which shows the excellent solder resistance in packaging a semiconductor chip may be obtained.

Compound (F) containing an aromatic ring in which at least two adjacent carbon atoms of the ring member carbon atoms are coupled to hydroxyl group (referred to "Compound (F)") may contain optionally a substituent other than the hydroxyl groups. Compound (F) may be a monocyclic compound represented by general formula (6) or a polycyclic compound represented by general formula (7).

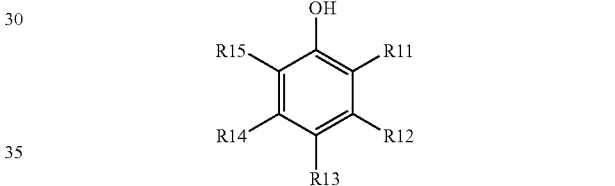

(6)

In the formula (6), one of R11 and R15 is hydroxyl. That is, one is hydroxyl, and the other is hydrogen, hydroxyl or a substituent other than hydroxyl, such as alkyl group. R12, R13 and R14 are hydrogen, hydroxyl or a substituent other than hydroxyl.

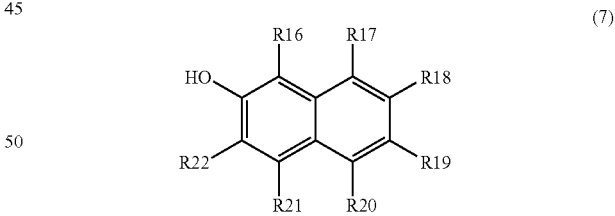

(7)

In the formula (7), one of R16 and R22 is hydroxyl. That is, one is hydroxyl, and the other is hydrogen, hydroxyl or a substituent other than hydroxyl, such as alkyl group. R17, R18, R19, R20 and R21 are hydrogen, hydroxyl or a substituent other than hydroxyl.

Examples of the monocyclic compound represented by the general formula (6) include catechol, pyrogallol, gallic acid, gallic acid esters, and their derivatives. Examples of the polycyclic compound represented by the general formula (7) include 1,2-dihydroxynaphthalene, 2,3-dihydroxynaphthalene and their derivatives. In particular, from the aspect of facility of controlling the flowability and the curability, it is preferred to employ a compound containing an aromatic ring in which two adjacent carbon atoms of the ring member carbon atoms are coupled to a hydroxyl group, respectively. From the aspect of volatilization during a kneading process, it is preferred to employ a compound in which a core ring is a naphthalene ring which contributes to lower volatility and weighing stability. From those view point, Compound (F) may be, for example, a naphthalene-containing compound such as 1,2-dihydroxynaphthalene, 2,3-dihydroxynaphthalene and their derivatives. The compounds (F) may be used in combination of two or more.

An amount of Compound (F) may be not less than 0.01% by weight, preferably not less than 0.01% by weight and not more than 1% by weight, more preferably not less than 0.03% by weight and not more than 0.8% by weight, in particular not less than 0.05% by weight and not more than 0.5% by weight of the total amount of an epoxy resin composition. When an amount of the Compound (F) is too low, there is a tendency that expected viscosity or flow properties by synergetic effect with a silane coupling agent (E) may not be obtained. While when it is too high, there is a tendency that curing reaction of the epoxy resin composition may be inhibited to lead to deteriorating physical properties of the resulting cured product, so that the performance as a resin composition for encapsulating a semiconductor chip may be deteriorated. Then, the amount of the Compound (F) is set to the above range, so that the epoxy resin composition becomes excellent in the balance of such properties.

Although an epoxy resin composition of the present embodiment comprises the above components (A) to (F) as essential components, it may further contain, if necessary, additives including a mold-releasing agent, for example, natural wax such as carnauba wax, synthetic wax such as polyethylene wax, higher fatty acid and metal salt thereof such as stearic acid, zinc stearate, and paraffin; coloring agent, for example, carbon black and red iron oxide; a low-stress additive, for example, silicone oil and silicone rubber; and an inorganic ion exchanger, for example, bismuth oxide hydrate, as appropriate.

An epoxy resin composition of the present embodiment may be prepared by homogeneously mixing components (A) to (F) and other additives in a mixer at an ambient temperature, followed by melt-kneading using an appropriate apparatus such as a heating roller, kneader or extruder, cooling and then grinding.

For encapsulating a semiconductor chip using an epoxy resin composition of the embodiment mentioned above to provide a semiconductor device, the composition may be molded and cured by an appropriate molding process such as transfer molding, compression molding and injection molding.

EXAMPLES

The present invention will be illustrated by the following experimental examples, and the invention is not limited to the examples. Compounding rate below is in terms of part(s) by weight.

Experimental Example 1

A phenol phenyl aralkyl epoxy resin (epoxy equivalent of 235; "n" in formula (1) is 4.0; melting point of 52 degrees C.): 6.8 parts by weight;

a phenol biphenyl aralkyl resin (Meiwa Kasei Co., Ltd., MEH-7851SS; hydroxyl equivalent of 203; "n" in formula (2) is 2.5; softening point of 66° C.; R1 is biphenylene, R2(OH) is phenol, R3 is hydrogen, R4 is hydrogen): 5.9 parts by weight;

spherical fused silica (average particle size of 30 μm): 86.0 parts by weight;

triphenyl phosphine: 0.2 parts by weight;

γ-glycidylpropyl-trimethoxysilane: 0.6 parts by weight;

2,3-dihydroxynaphthalene: 0.05 parts by weight;

carnauba wax: 0.2 parts by weight; and carbon black: 0.3 parts by weight were mixed in a mixer at an ambient temperature, followed by melt kneading by a heating roller at 80 to 100 degrees C., cooling and then grinding to obtain an epoxy resin composition. The resultant epoxy resin composition was evaluated as follows. The evaluation results are shown in Table 1.

Spiral flow; the epoxy resin composition of Experimental Example 1 was molded by a low-pressure transfer molding machine under the conditions of a temperature: 175 degrees C., a molding pressure: 6.9 MPa and a pressure keeping time: 120 sec, using a mold in accordance with EMMI-1-66, and then a spiral flow was determined. A spiral flow is a parameter for flowability. The larger the parameter is, the better flowability is. The resulting value is in terms of "cm".

Curing torque ratio: Using a curastometer (Orientec Inc., JSR Curastometer Type IVPS), a torque was determined 90 and 300 sec after initiation of heating at a mold temperature of 175 degrees C. Then, a curing torque ratio=(torque after 90 sec)/(torque after 300 sec) was calculated. A torque determined by a curastometer is a parameter for thermal rigidity. The larger the curing torque ratio is, the better curability is. The resulting value is in terms of "%".

Water absorption coefficient: using a transfer molding machine, a molded product with a diameter of 50 mm and a thickness of 3 mm was prepared under the condition of a mold temperature of 175 degrees C., an injection pressure of 7.4 Mpa and a curing time of 2 min, then was post-cured at 175 degrees C. for 8 hours. The resulting molded product was humidified for 168 hours under the condition of a temperature of 85 degrees C. and a relative humidity of 85%. The water absorption coefficient was obtained by measuring change of the weight during the humidification. The resulting value is in terms of "% by weight".

Flame retardance: test pieces for flame retardancy with a thickness of 3.2 mm were prepared under the conditions of a mold temperature of 175 degrees C., an injection time: 15 sec, a curing time of 120 sec, and an injection pressure of 9.8 MPa and was tested for flame retardancy in accordance with the specification of UL94.

Crack resistance during soldering: using a low-pressure transfer molding machine, a 100pQFP frame (Cu frame) with a body size of 14×14×1.4 mm to which an Si chip with a size of 6×6×0.30 mm was adhered was molded under the conditions of a mold temperature of 175 degrees C., an injection time of 10 sec, a curing time of 90 sec and an injection pressure of 9.8 MPa. After post-curing at 175 degrees C. for 8 hrs, the resulting molded product was humidified for 48 hours under the condition of a temperature of 85 degrees C. and a relative humidity of 85% and passed through an IR reflow at a peak temperature of 260 degrees C. consecutive three times (three times, 10 sec at 255 degrees C. or higher for each run). Then, it was examined for internal cracks and delaminations using Scanning Accoustic Tomograph. Evaluation was based on the numbers of delaminations between the chip and the encapsulating resin, and internal cracks in 10 packages.

Experimental Examples 2 to 29

According to the blending ratios shown in Tables 1 and 2, epoxy resin compositions were prepared and evaluated as described in Experimental Example 1. The evaluation results are shown in Tables 1 and 2.

Components used other than those in Experimental Example 1 are as follows.

A biphenyl epoxy resin (Japan Epoxy Resin Inc., YX4000H, melting point of 105 degrees C.; epoxy equivalent of 191);

A phenol phenyl aralkyl resin (Mitsui Chemical Inc., XLC-4L, softening point of 65 degrees C.; hydroxyl equivalent of 165; "n" in formula (2) is 3.4; R1 is phenylene, R2(OH) is phenol, R3 is hydrogen, R4 is hydrogen);

A naphthol phenyl aralkyl resin (Nippon Steel Chemical Co., Ltd., SN-485, softening point of 85 degrees C.; hydroxyl equivalent of 210; "n" in formula (2) is 1.6; R1 is phenylene, R2(OH) is beta-naphthol, R3 is hydrogen, R4 is hydrogen);

a phenol novolac resin (Sumitomo Bakelite Co., Ltd., PR-HF-3; softening point of 80 degrees C.; hydroxyl equivalent of 105);

γ-mercaptopropyltrimethoxysilane;

1,8-diazabicyclo(5,4,0)undecene-7 (hereinafter, referred to as "DBU");

a curing accelerator represented by formula (8);

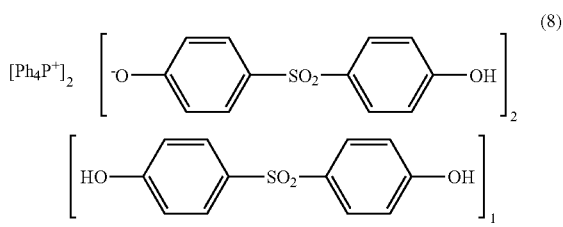

a curing accelerator represented by formula (9);

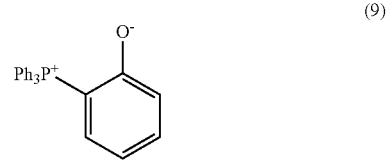

1,2-dihydroxynaphthalene;
catechol;
pyrogallol;
1,6-dihydroxynaphthalene; and
resorcinol.

TABLE 1

| | Experimental Examples | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Phenol phenyl aralkyl epoxy resin | 6.8 | 6.9 | 6.8 | 6.6 | 7.0 | 7.5 | 6.8 | 3.3 | 6.9 | 9.0 | 5.8 | 6.9 | 6.9 | 6.9 | 6.9 | 6.8 | 6.9 |
| Biphenyl epoxy resin | | | | | | | | 3.3 | | | | | | | | | |
| Phenol biphenyl aralkyl resin | 5.9 | 5.9 | 5.9 | 5.7 | 6.0 | | | 6.3 | 5.9 | 7.8 | 5.0 | 5.9 | 5.9 | 5.9 | 5.9 | 5.9 | 5.9 |
| Phenol phenyl aralkyl resin | | | | | | 5.3 | | | | | | | | | | | |
| Naphthol phenyl aralkyl resin | | | | | | | 6.1 | | | | | | | | | | |
| Spherical fused silica | 86.0 | 86.0 | 86.0 | 86.0 | 86.0 | 86.0 | 86.0 | 86.0 | 86.0 | 82.0 | 88.0 | 86.0 | 86.0 | 86.0 | 86.0 | 86.0 | 86.0 |
| Triphenyl phosphine | 0.2 | 0.2 | 0.2 | 0.2 | 0.2 | 0.2 | 0.2 | 0.2 | 0.2 | 0.2 | 0.2 | 0.2 | 0.2 | 0.2 | | | |
| DBU | | | | | | | | | | | | | | | 0.2 | | |
| Curing accelerator of Formula (8) | | | | | | | | | | | | | | | | 0.3 | |
| Curing accelerator of Formula (9) | | | | | | | | | | | | | | | | | 0.2 |
| γ-glycidylpropyl-trimethoxysilane | 0.6 | 0.3 | 0.1 | 0.9 | 0.3 | 0.3 | 0.3 | 0.3 | | 0.3 | 0.3 | 0.3 | 0.3 | 0.3 | 0.3 | 0.3 | 0.3 |
| γ-mercaptopropyl-trimethoxysilane | | | | | | | | | 0.3 | | | | | | | | |
| 2,3-dihydroxy-naphthalene | 0.05 | 0.2 | 0.5 | 0.2 | 0.02 | 0.2 | 0.2 | 0.2 | 0.2 | 0.2 | 0.2 | | | | 0.2 | 0.2 | 0.2 |
| 1,2-dihydroxy-naphthalene | | | | | | | | | | | | 0.2 | | | | | |
| catechol | | | | | | | | | | | | | 0.2 | | | | |
| pyrogallol | | | | | | | | | | | | | | 0.2 | | | |
| carnauba wax | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| carbon black | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| Spiral flow (cm) | 95 | 90 | 85 | 92 | 95 | 98 | 92 | 123 | 98 | 155 | 80 | 90 | 91 | 92 | 86 | 93 | 91 |
| Curing torque ratio (%) | 63 | 62 | 61 | 63 | 62 | 69 | 88 | 61 | 64 | 59 | 67 | 62 | 63 | 62 | 62 | 87 | 82 |

TABLE 1-continued

| | Experimental Examples | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Water absorption coefficient (%) | 0.16 | 0.16 | 0.16 | 0.17 | 0.16 | 0.18 | 0.15 | 0.20 | 0.16 | 0.25 | 0.14 | 0.16 | 0.16 | 0.16 | 0.16 | 0.16 | 0.16 |
| Flame retardance UL-94 | V-0 | V-0 | V-0 | V-0 | V-0 | V-0 | V-0 | V-0 | V-0 | V-0 | V-0 | V-0 | V-0 | V-0 | V-0 | V-0 | V-0 |
| Crack resistance during soldering n/10 | 0 | 0 | 0 | 0 | 0 | 0 | 0 | 0 | 0 | 0 | 0 | 0 | 0 | 0 | 0 | 0 | 0 |

TABLE 2

| | Experimental Examples | | | | | | | | | | | |
|---|---|---|---|---|---|---|---|---|---|---|---|---|
| | 18 | 19 | 20 | 21 | 22 | 23 | 24 | 25 | 26 | 27 | 28 | 29 |
| Phenol phenyl aralkyl epoxy resin | 7.0 | | 8.9 | | 7.0 | 7.1 | 7.0 | 6.9 | 6.9 | 7.0 | 6.9 | 7.0 |
| Biphenyl epoxy resin | | 6.2 | | 8.3 | | | | | | | | |
| Phenol biphenyl aralkyl resin | 6.0 | 6.6 | | | 6.0 | 6.2 | 6.1 | 5.9 | 5.9 | 6.0 | 6.0 | 6.0 |
| Phenol novolac resin | | | 4.0 | 4.5 | | | | | | | | |
| Spherical fused silica | 86.0 | 86.0 | 86.0 | 86.0 | 86.0 | 86.0 | 86.0 | 86.0 | 86.0 | 86.0 | 86.0 | 86.0 |
| Triphenyl phosphine | 0.2 | 0.2 | 0.2 | 0.2 | 0.2 | 0.2 | 0.2 | 0.2 | 0.2 | | | |
| DBU | | | | | | | | | | 0.2 | | |
| Curing accelerator of Formula (8) | | | | | | | | | | | 0.3 | |
| Curing accelerator of Formula (9) | | | | | | | | | | | | 0.2 |
| γ-glycidylpropyl-trimethoxysilane | 0.3 | 0.3 | 0.3 | 0.3 | 0.3 | | | 0.3 | 0.3 | 0.3 | 0.3 | 0.3 |
| 2,3-dihydroxy-naphthalene | | 0.2 | 0.2 | 0.2 | 0.008 | | 0.2 | | | | | |
| 1,6-dihydroxy-naphthalene | | | | | | | | 0.2 | | | | |
| resorcinol | | | | | | | | | | 0.2 | | |
| carnauba wax | 0.2 | 0.2 | 0.2 | 0.2 | 0.2 | 0.2 | 0.2 | 0.2 | 0.2 | 0.2 | 0.2 | 0.2 |
| carbon black | 0.3 | 0.3 | 0.3 | 0.3 | 0.3 | 0.3 | 0.3 | 0.3 | 0.3 | 0.3 | 0.3 | 0.3 |
| Spiral flow (cm) | 59 | 140 | 78 | 102 | 65 | 74 | 92 | 77 | 78 | 62 | 73 | 69 |
| Curing torque ratio (%) | 69 | 55 | 73 | 64 | 64 | 68 | 62 | 62 | 63 | 69 | 82 | 80 |
| Water absorption coefficient (%) | 0.16 | 0.19 | 0.24 | 0.27 | 0.16 | 0.15 | 0.16 | 0.16 | 0.16 | 0.16 | 0.17 | 0.15 |
| Flame retardance UL-94 | V-0 | V-1 | V-1 | burnt | V-0 | V-0 | V-0 | V-0 | V-0 | V-0 | V-0 | V-0 |
| Crack resistance during soldering n/10 | 0 | 5 | 6 | 8 | 0 | 3 | 3 | 0 | 0 | 0 | 0 | 0 |

All epoxy resin compositions of Experimental Examples 1 to 17 showed excellent flowability, curability, low water absorption, flame retardance and crack resistance during soldering. In Experimental Example 19 not using an epoxy resin (A) represented by the general formula (1), the epoxy resin composition showed good flowability, and, on the contrary, low curability and insufficient flame retardance. Further, with respect to Experimental Example 19, the epoxy resin composition showed high water absorption, so that is showed infer in solder resistance. In Experimental Example 20 not using a phenolic resin (B) represented by the general formula (2), the epoxy resin composition showed good curability, and, on the contrary, low flowability and flame retardance. Further, with respect to Experimental Example 20, the epoxy resin composition showed high water absorption, so that is showed infer in solder resistance. Moreover, in Experimental Example 21 not using any of an epoxy resin (A) represented by the general formula (1) nor a phenolic resin (B) represented by the general formula (2), the epoxy resin composition showed further infer in low water absorption, flame retardance and crack resistance during soldering. In Experimental Examples 23 and 24 not using a silane coupling agent (E), adhesive properties to an organic substrate and metal substrate of the epoxy resin composition was deteriorated, so that the epoxy resin composition showed infer in the crack resistance during soldering. In Experimental Examples 18, 22, 23, 25, 26, 27, 28 and 29 not using or short of Compound (F) containing an aromatic ring in which at least two adjacent carbon atoms of the ring member carbon atoms are coupled to a hydroxyl group, respectively, the flowability of the epoxy resin compositions was deteriorated, so that it might be highly possible to cause troubles at encapsulating a semiconductor chip, such as deformation of wirings and defective filling. As mentioned above, employing an epoxy resin composition of the invention can provide a semiconductor device package, which shows excellent balance in flowability, curability, flame retardance and crack resistance during soldering.

It is apparent that the present invention is not limited to the above embodiment that may be modified and changed without departing from the scope and spirit of the invention.

What is claimed is:

1. A resin composition for encapsulating a semiconductor chip comprising:

an epoxy resin (A) represented by general formula (1):

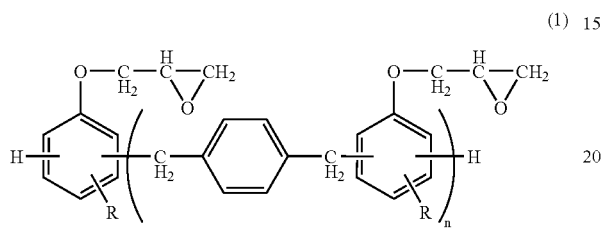

(1)

wherein each R may be the same or different from each other, and represents hydrogen or a hydrocarbon group having 4 or less carbon atoms; and n is an average, and represents a positive number from 1 to 5;

a phenolic resin (B) represented by general formula 2':

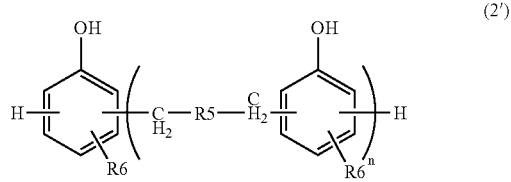

(2')

wherein R5 represents phenylene or biphenylene, each R6 may be the same or different from each other, and represents hydrogen or a hydrocarbon group having 4 or less carbon atoms, and n is an average, and represents a positive number from 1 to 5;

an inorganic filler (C);

a curing accelerator (D);

a silane coupling agent (E); and

Compound (F) containing naphthalene ring in which at least two adjacent carbon atoms of the ring member carbon atoms are coupled to a hydroxyl group, respectively.

2. The resin composition for encapsulating a semiconductor chip according to claim 1, wherein the amount of said Compound (F) is not less than 0.01% by weight.

3. The resin composition for encapsulating a semiconductor chip according to claim 1, wherein the amount of said silane coupling agent (E) is not less than 0.01% by weight and not more than 1% by weight.

4. The resin composition for encapsulating a semiconductor chip according to claim 1, wherein the amount of said inorganic filler (C) is not less than 80% by weight and not more than 92% by weight.

5. A semiconductor device comprising a semiconductor chip is encapsulated by the resin composition for encapsulating a semiconductor chip according to claim 1.

* * * * *